US010665022B2

(12) United States Patent
George

(10) Patent No.: US 10,665,022 B2
(45) Date of Patent: May 26, 2020

(54) AUGMENTED REALITY DISPLAY SYSTEM FOR OVERLAYING APPAREL AND FITNESS INFORMATION

(71) Applicant: PerfectFit Systems Pvt. Ltd., Cochin, Kerala (IN)

(72) Inventor: Eobin Alex George, Kerala (IN)

( * ) Notice: Subject to any disclaimer, the term of this patent is extended or adjusted under 35 U.S.C. 154(b) by 244 days.

(21) Appl. No.: 15/614,901

(22) Filed: Jun. 6, 2017

(65) Prior Publication Data

US 2018/0350148 A1    Dec. 6, 2018

(51) Int. Cl.
| | |
|---|---|
| *G06K 9/00* | (2006.01) |
| *G09B 5/02* | (2006.01) |
| *G09B 19/00* | (2006.01) |
| *G06T 19/00* | (2011.01) |
| *G06T 7/73* | (2017.01) |
| *G06T 7/11* | (2017.01) |
| *G06K 9/46* | (2006.01) |
| *G06K 9/62* | (2006.01) |
| *A63B 24/00* | (2006.01) |
| *G06T 11/00* | (2006.01) |

(52) U.S. Cl.
CPC ........ *G06T 19/006* (2013.01); *A63B 24/0075* (2013.01); *G06K 9/00335* (2013.01); *G06K 9/46* (2013.01); *G06K 9/6256* (2013.01); *G06T 7/11* (2017.01); *G06T 7/73* (2017.01); *G06T 11/00* (2013.01); *G09B 5/02* (2013.01); *G09B 19/003* (2013.01); *G09B 19/0038* (2013.01); *G06T 2207/10028* (2013.01); *G06T 2207/20081* (2013.01); *G06T 2207/30196* (2013.01); *G06T 2210/16* (2013.01)

(58) Field of Classification Search
CPC ........................................................ G09B 5/02
See application file for complete search history.

(56) References Cited

U.S. PATENT DOCUMENTS

| | | | | |
|---|---|---|---|---|
| 8,275,590 | B2 * | 9/2012 | Szymczyk | G06Q 30/0603 345/418 |
| 9,477,980 | B2 * | 10/2016 | Zagel | G06K 9/00369 |
| 9,513,788 | B2 * | 12/2016 | Suzuki | G06F 3/04845 |
| 10,008,039 | B1 * | 6/2018 | Neustein | G06T 19/006 |
| 10,052,026 | B1 * | 8/2018 | Tran | G16H 50/30 |
| 2004/0227752 | A1 * | 11/2004 | McCartha | A41H 3/007 345/419 |
| 2008/0163344 | A1 * | 7/2008 | Yang | G06Q 30/0201 726/4 |

(Continued)

*Primary Examiner* — Robert J Utama

(57) ABSTRACT

The present disclosure relates to an augmented reality display system. The augmented reality display system includes an augmented reality mirror, a display device, a scanning setup and a data processing system. The data processing system receives the first set of data of a user and collects the second set of data associated with the user. Moreover, the data processing system analyzes the first and second set of data in real time and estimates the position of each feature of the body of the user. Also, the data processing system slices each feature of the body of the user to measures a set of feature metrics. Further, the data processing system create one or more feature metric databases. Moreover, the data processing system maps the feature metric database with a pre-defined set of products. The data processing system overlay and display the information related to the fitness, health and apparel.

20 Claims, 6 Drawing Sheets

(56) References Cited

U.S. PATENT DOCUMENTS

| | | | |
|---|---|---|---|
| 2008/0252596 A1* | 10/2008 | Bell | G06F 3/0304 345/156 |
| 2011/0298897 A1* | 12/2011 | Sareen | G06N 3/006 348/47 |
| 2012/0086783 A1* | 4/2012 | Sareen | G06N 3/006 348/47 |
| 2012/0218423 A1* | 8/2012 | Smith | G06Q 30/02 348/207.1 |
| 2012/0287122 A1* | 11/2012 | Nadar | G06T 17/00 345/419 |
| 2013/0097194 A1* | 4/2013 | Braga | G06F 16/5838 707/758 |
| 2013/0110666 A1* | 5/2013 | Aubrey | G06Q 30/0269 705/26.5 |
| 2013/0113830 A1* | 5/2013 | Suzuki | G06T 3/00 345/634 |
| 2013/0215116 A1* | 8/2013 | Siddique | G06Q 30/0643 345/420 |
| 2013/0219434 A1* | 8/2013 | Farrell | H04N 21/4722 725/60 |
| 2013/0229482 A1* | 9/2013 | Vilcovsky | H04N 7/144 348/14.07 |
| 2014/0035913 A1* | 2/2014 | Higgins | G06T 17/00 345/420 |
| 2014/0168217 A1* | 6/2014 | Kim | G06T 13/40 345/420 |
| 2014/0176565 A1* | 6/2014 | Adeyoola | G06T 19/006 345/473 |
| 2014/0225977 A1* | 8/2014 | Vilcovsky | G06Q 30/00 348/14.07 |
| 2014/0225978 A1* | 8/2014 | Saban | H04N 1/622 348/14.07 |
| 2014/0226000 A1* | 8/2014 | Vilcovsky | G06F 3/017 348/77 |
| 2014/0226900 A1* | 8/2014 | Saban | G02B 5/08 382/165 |
| 2015/0022550 A1* | 1/2015 | Katpally Reddy | G06T 19/006 345/632 |
| 2015/0120496 A1* | 4/2015 | Watson | G06F 3/147 705/26.8 |
| 2015/0154691 A1* | 6/2015 | Curry | G06Q 30/0643 705/27.2 |
| 2015/0279098 A1* | 10/2015 | Kim | G06T 17/20 345/420 |
| 2016/0063588 A1* | 3/2016 | Gadre | G06Q 30/0623 705/26.61 |
| 2016/0127710 A1* | 5/2016 | Saban | G02B 5/08 386/241 |
| 2016/0240002 A1* | 8/2016 | Ogata | G06T 19/00 |
| 2016/0284132 A1* | 9/2016 | Kim | G06T 19/006 |
| 2017/0004567 A1* | 1/2017 | Dutt | G06Q 30/0643 |
| 2017/0024928 A1* | 1/2017 | Su muth | G06Q 30/0621 |
| 2017/0091995 A1* | 3/2017 | Yu | G06F 3/0416 |
| 2017/0287060 A1* | 10/2017 | Choi | G06F 3/002 |
| 2017/0352091 A1* | 12/2017 | Chen | G06T 19/20 |
| 2017/0352092 A1* | 12/2017 | Mitchell | G06T 15/503 |
| 2018/0010351 A1* | 1/2018 | Berry | E04H 1/1222 |
| 2018/0122096 A1* | 5/2018 | Yang | H04N 5/232 |
| 2019/0026954 A1* | 1/2019 | Vats | G06T 19/20 |
| 2019/0050427 A1* | 2/2019 | Wiesel | G06N 20/00 |
| 2019/0050938 A1* | 2/2019 | Beraldo | G06Q 30/0643 |

* cited by examiner

AUGMENTED REALITY DISPLAY SYSTEM FOR OVERLAYING APPAREL AND FITNESS INFORMATION

TECHNICAL FIELD

The disclosure relates to the field of augmented reality. More particularly, the present disclosure relates to an augmented reality display system to display information of a user on a large screen display.

BACKGROUND

With the development of sophisticated computer vision techniques for solving trivial problems in the recent years, the use of mirror displays has increased gradually in advertising or fashion field. Traditionally, many offline retail stores have started utilizing a smart mirror concept for allowing users to try on clothes virtually. The smart mirror displays augmented reality images and other information on a screen of the mirror. The smart mirror is combined with traditional computer vision techniques for extracting 3D scans of the user in real time. The traditional computer vision techniques rely on extracting surface body models and skeleton points from 3D scans of the user. The process of capturing shape, facial features and curves of a subject in detail and subsequent image acquisition requires significantly higher computation power and bandwidth which further requires expensive, studio like equipment. The development of 3D product fitted models of users and monitoring exercise performance is significantly trivial to achieve without compromising with computational efficiency, precision, render quality and feature accuracies. To add to the issue, the present techniques don't provide any efficient solutions for portability and therefore, pose a challenge for mass usage of such facilities. As an example, the user is required to stay present in the line of sight of the scanning devices for real time capturing of features which renders unavailability of such options at home or personal indoor areas. Further, the present techniques take more processing time for rendering information over the user.

SUMMARY

In a first example, an augmented reality display system is provided. The augmented reality display system may provide an image of a user of one or more users on a display of a mirror for overlaying one or more information on the mirror in real time. The augmented reality display system may include an augmented reality mirror. The augmented reality mirror may include a reflective coating on a first region of the augmented reality mirror. The augmented reality mirror may include a dispersive coating on a second region of the augmented reality mirror. Further, the augmented reality display system may include a display device. The display device may be positioned at an angle near the second region of the augmented reality mirror. Moreover, the augmented reality display system may include a scanning system. The scanning system may be positioned in a vicinity of the augmented reality mirror. Furthermore, the augmented reality display system may include a processor. The processor may be coupled to the scanning system. The processor is associated with a data processing system. The data processing system may receive a first set of data. The first set of data may include a plurality of depth maps of the body of the user. The first set of data characterizes a three-dimensional geometry of the body of the user from the plurality of spatial parameters. Further, the data processing system may include collect a second set of data. The second step of data may be associated with the user. Moreover, the data processing system may analyze the first set of data and the second set of data. The data processing system may estimate the position of each feature of the plurality of features of the body of the user. The data processing system may slice each feature of the plurality of features of the body of the user at a slicing angle along the axis of reference and through a geometric center of corresponding features. In addition, the slicing angle is corrected for each feature along the axis of reference. Moreover, the approximate geometric center is determined for each feature of the plurality of features of the body. The data processing system may measure a set of feature metrics of each sliced feature of the plurality of features. The set of feature metrics may be associated with the spatial geometric measurements of the body. The data processing system may create one or more feature metric databases. The one or more feature metric databases may correspond to a measured set of feature metrics for each sliced feature of the plurality of features. The data processing system may map one or more records of the one or more feature metric databases with corresponding feature metric records of a pre-defined set of products. The data processing system may overlay at least one of one or more products over the body of the user. In addition, the data processing system may overlay one or more information on the augmented reality mirror in real time. The data processing system may display at least one of the overlays of the one or more products over the body of the user. Further, the data processing system may display the one or more fitness related information on the augmented reality mirror in real time. The first region and the second region are opposite to each other. The display device may be configured for displaying an augmented reality image of the user located in proximity of the augmented reality mirror in real time. The scanning system may be configured for obtaining body scans of the user located in the proximity of the augmented reality mirror. Furthermore, the scanning may be done in real time. The first set of data may be analyzed to infer the plurality of spatial parameters of the body of the user. The plurality of spatial parameters may include a posture of the body, a position of each feature of a plurality of features of the body, an axis of reference and a position of joints. The second set of data may include user preferences data and a position of the user with respect to the augmented reality mirror. The set of feature metrics of each sliced feature is measured by the elimination of at least one of speckle noise, one or more non-feature regions, creases and folds. Each feature metric database of the one or more feature metric databases may include a normalized size and a range of sizes for each feature of the body of the user. The one or more products may be overlaid on the user. The overlaying may be based on the one or more recommendations of products. The one or more recommendation of products may be based on a positive mapping of the one or more records of the one or more feature metric databases of the body with corresponding feature metric records of the products. The overlaying of the one or more products may be done on the basis of second set of data. The display of the one or more overlay information may be done through the display device in real time.

In a second example, a computer-implemented method is provided. The computer-implemented method may render an image of a user of one or more users on a display of a mirror for overlaying one or more information on the mirror in real time. The computer-implemented method may include a first step of reception of a first set of data. The first set of data may include a plurality of depth maps of the body of the user. The first set of data characterizes a three-dimensional geometry of the body of the user from the plurality of spatial parameters. Further, the computer-implemented method may include a second step of collection of a second set of data. The second step of data may be associated with the user. Moreover, the computer-implemented method may include a third step of analysis of the first set of data and the second set of data. The computer-implemented method may include a fourth step of estimation of the position of each feature of the plurality of features of the body of the user. The computer-implemented method may include a fifth step of slicing of each feature of the plurality of features of the body of the user at a slicing angle along the axis of reference and through a geometric center of corresponding features. In addition, the slicing angle is corrected for each feature along the axis of reference. Moreover, the approximate geometric center is determined for each feature of the plurality of features of the body. The computer-implemented method may include a sixth step of measurement of a set of feature metrics of each sliced feature of the plurality of features. The set of feature metrics may be associated with the spatial geometric measurements of the body. The computer-implemented method may include a seventh step of creation of one or more feature metric databases. The one or more feature metric databases may correspond to a measured set of feature metrics for each sliced feature of the plurality of features. The computer-implemented method may include an eighth step of mapping of one or more records of the one or more feature metric databases with corresponding feature metric records of a pre-defined set of products. The computer-implemented method may include a ninth step of overlaying of at least one of one or more products over the body of the user. In addition, the one or more information may be overlaid on the augmented reality mirror in real time. The at least one of the overlays of the one or more products may be displayed over the body of the user. Further, the the one or more fitness related information may be displayed on the augmented reality mirror in real time.

BRIEF DESCRIPTION OF THE DRAWINGS

Figure 1A:
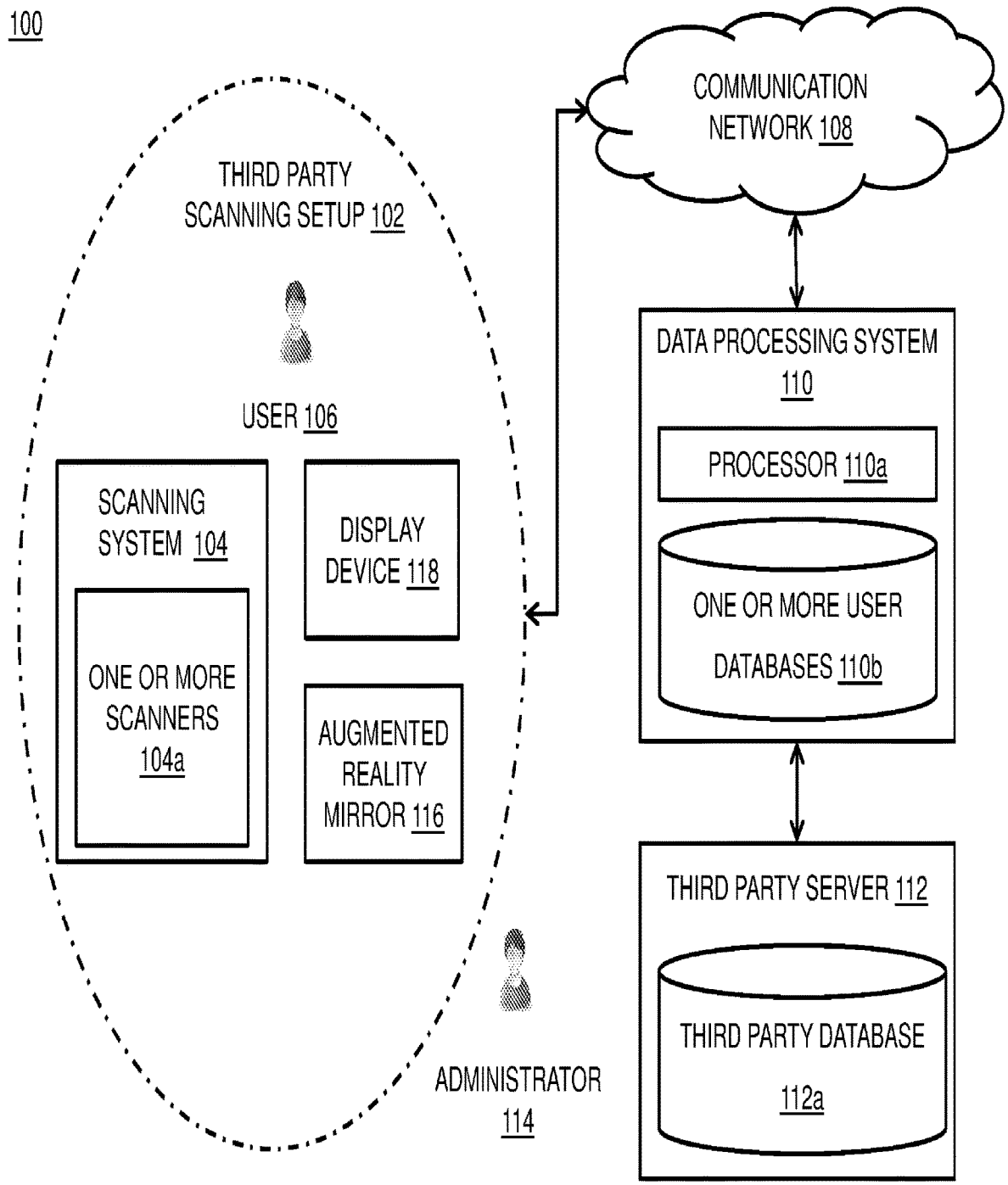
Figure 1B:
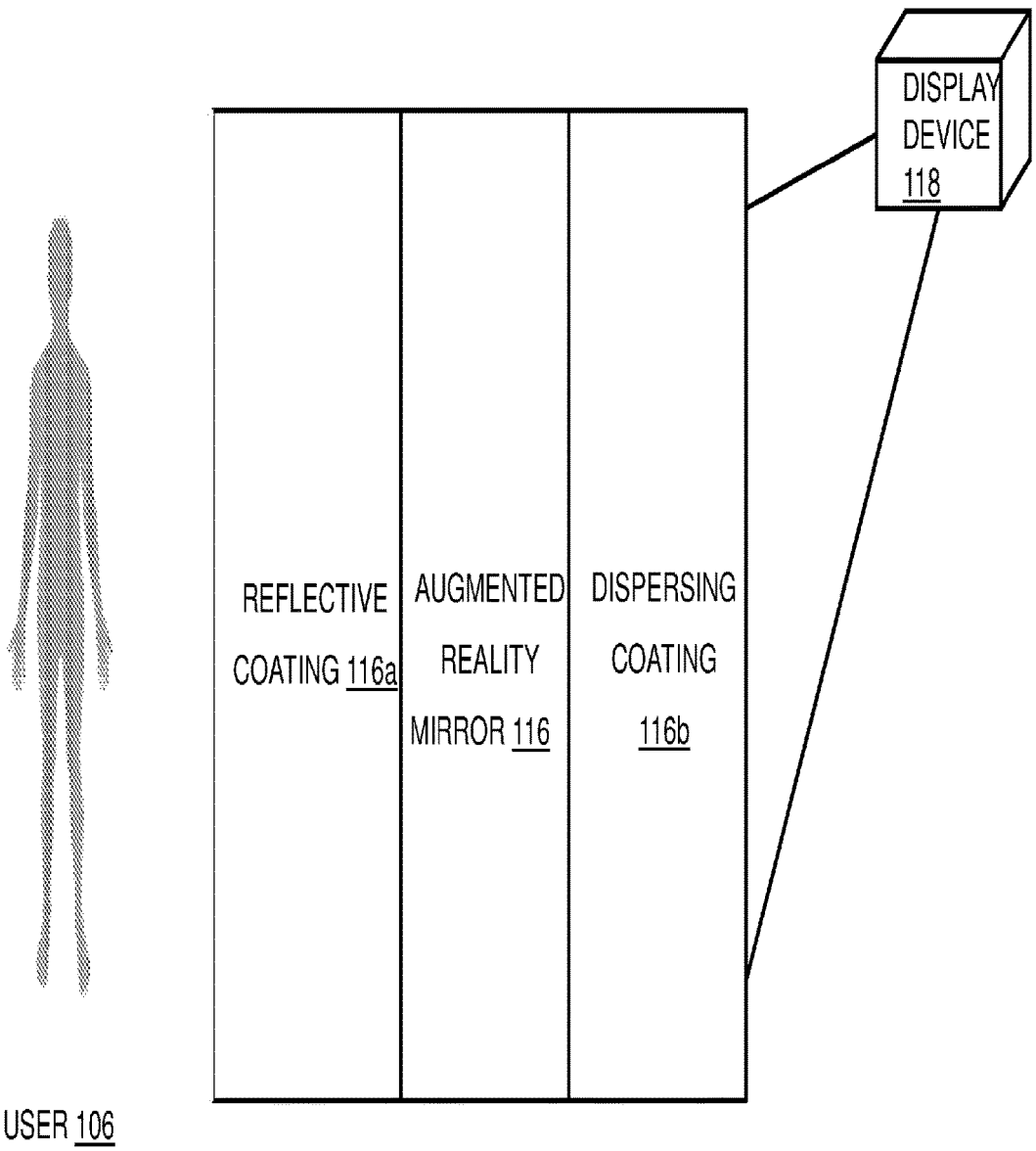
Figure 2:
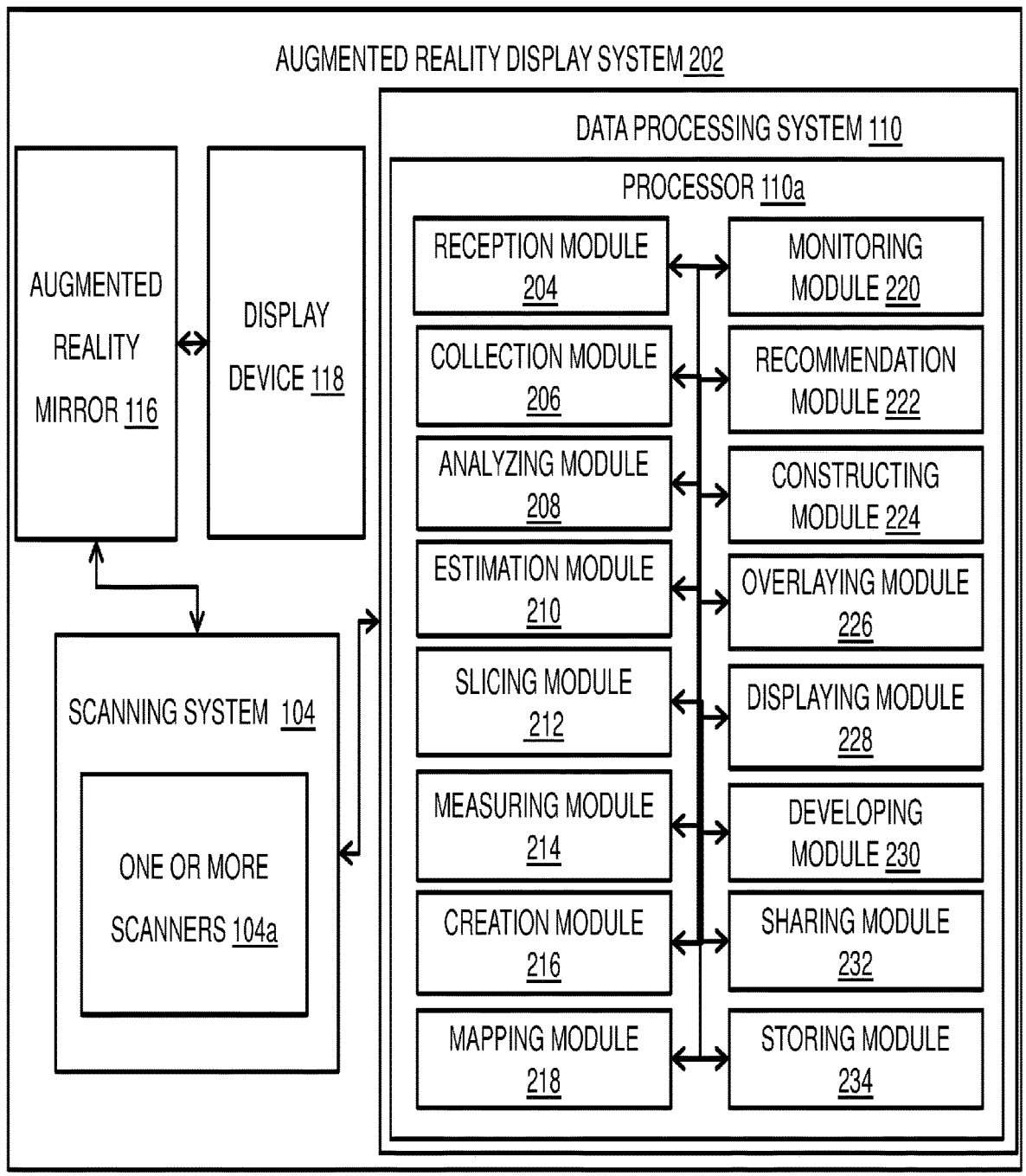
Figure 3A:
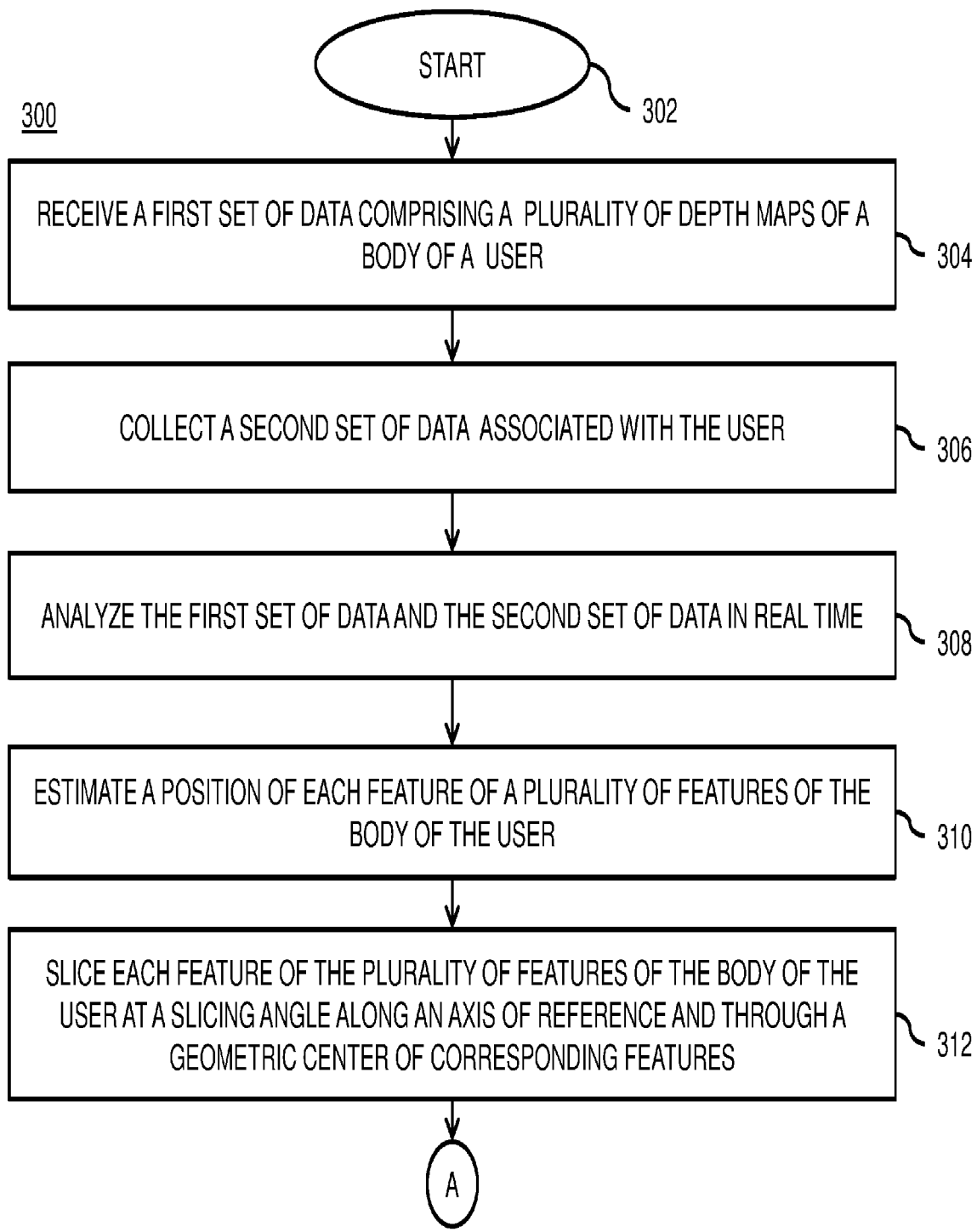
Figure 3B:
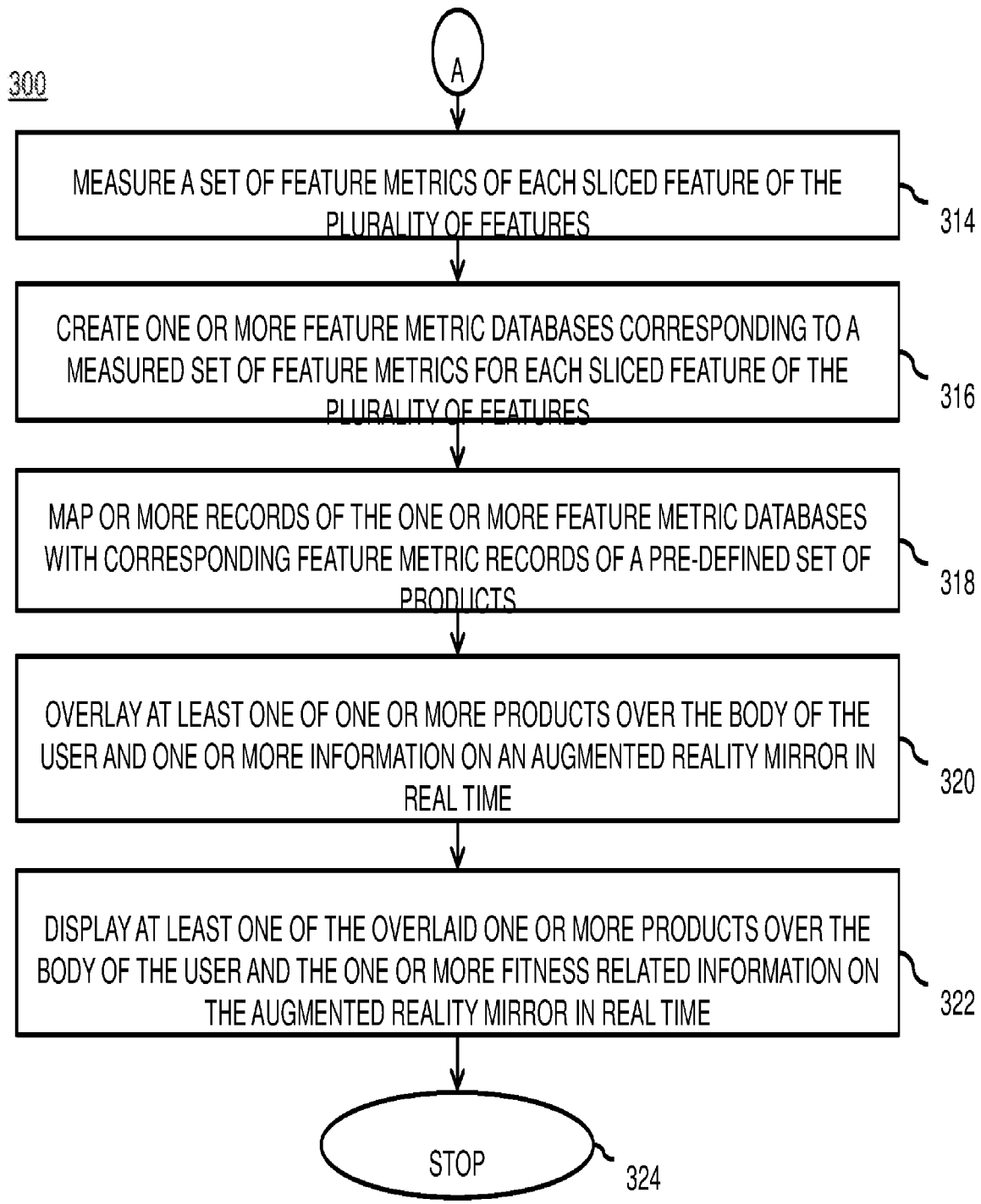
Figure 4:
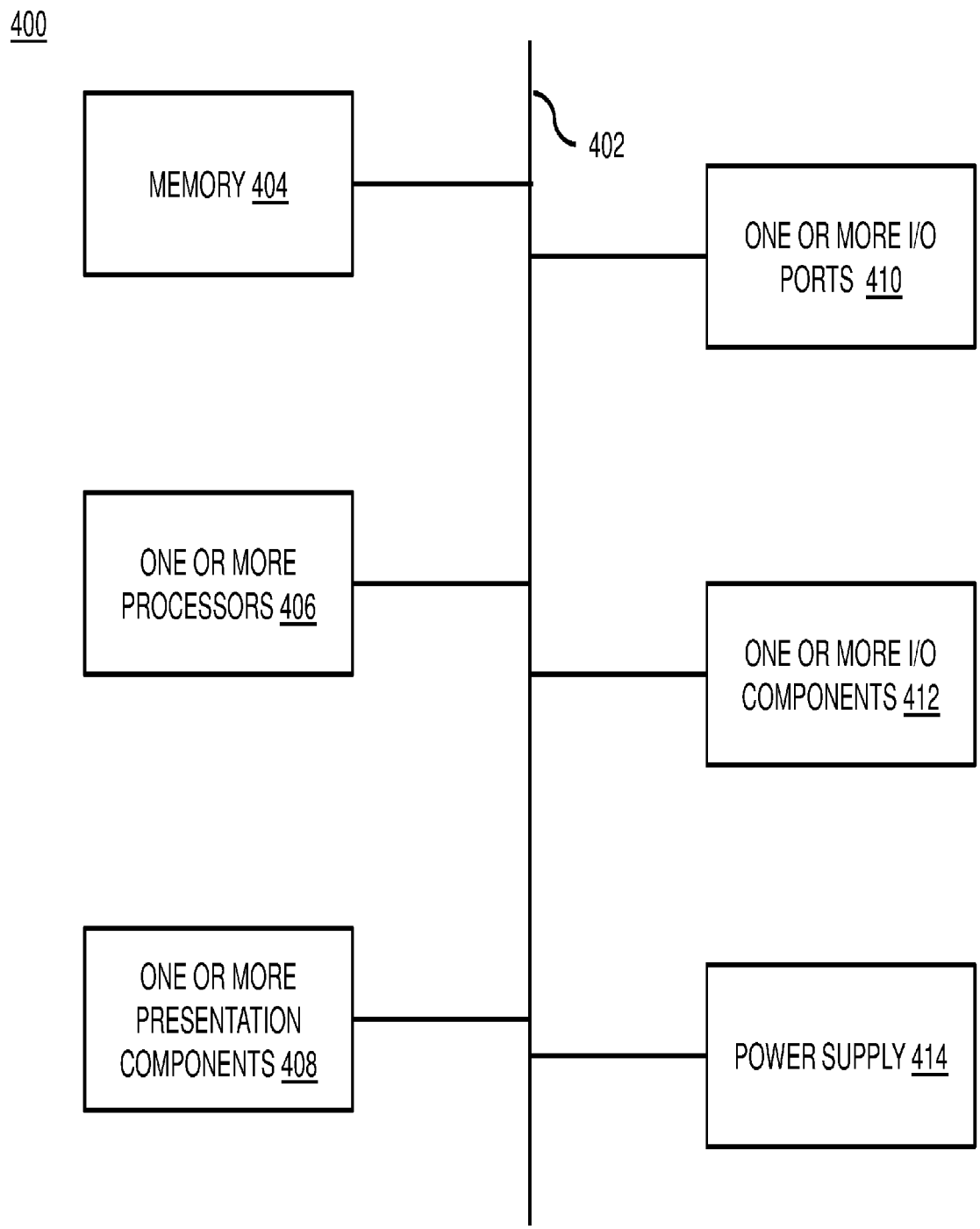

Having thus described the invention in general terms, reference will now be made to the accompanying drawings, which are not necessarily drawn to scale, and wherein:

FIG. 1A and FIG. 1B illustrates a block diagram of an interactive computing environment for processing of body scans of a user using a third party scanning setup, in accordance with an embodiment of the present disclosure;

FIG. 2 illustrates the block diagram of an augmented reality display system, in accordance with various embodiments of the present disclosure;

FIGS. 3A and 3B illustrate a flowchart for displaying overlaid information on a body of a user, in accordance with various embodiments of the present disclosure; and FIG. 4 illustrates the block diagram of a computing device, in accordance with various embodiments of the present disclosure.

There may be additional structures described in the description that are not depicted in the drawings, and the absence of such depictions should not be considered as an omission of such design from the specification.

DETAILED DESCRIPTION

Before describing embodiments in detail, it should be observed that the embodiments may utilize system components and method steps related to wireless power transmission, reception, and transfer. Accordingly, the system components have been represented where appropriate by conventional symbols in the drawings, showing specific details that are pertinent for an understanding of the embodiments so as not to obscure the description with details that will be readily apparent to those with ordinary skill in the art having the benefit of the description herein.

Detailed embodiments are disclosed herein; however, it is to be understood that the disclosed embodiments are merely exemplary of the claimed inventions, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure or method. Further, the terms and phrases used herein are not intended to be limiting but rather to provide an understandable description of the subject matter.

FIG. 1A and FIG. 1B illustrate block diagrams 100 of an interactive computing environment for processing of body scans of a user using a third party scanning setup, in accordance with an embodiment of the present disclosure. The interactive computing environment includes a third party scanning setup 102, a scanning system 104, a communication network 108, a data processing system 110 and a third party server 112. In addition, the interactive computing environment includes an augmented reality mirror 116 and a display device 118.

The third party scanning setup 102 is used for performing body scans of the user 106. The third party scanning setup 102 includes the scanning system 104 to get three dimensional (hereinafter "3D") scans of body of the user. The third party scanning setup 102 may be present in any environment to collect different body scans of the user 106. In an example, the environment may be any physical retail store, any gym, and any virtual trial room. In an embodiment of the present disclosure, any physical retail store includes the third party scanning setup 102 for providing virtual product trial facilities to the user 106. In another embodiment of the present disclosure, any gym includes the third party scanning setup 102 to keep a tab on performance of exercises and progress in body metrics with fitness activities and diet routines of the user 106.

The third party scanning setup 102 includes the scanning system 104, the augmented reality mirror 116, and the display device 118. The scanning system 104 includes one or more scanners 104a. The one or more scanners 104a may be a motion sensing input devices for capturing detailed and accurate depth images of the body of the user 106. The one or more scanners 104a scan the body of the user 106 with different angles and position. Each scanner of the one or more scanners 104a may use background software or applications to process the mathematical and statistical data models of the user 106. Examples of the one or more scanners 104a include but may not be limited to intel Realsense, asus Xtion and Microsoft Kinect. The one or more scanners 104a scan the body of the user 106 to get 3D and 2D image of the user 106. In an embodiment of the present disclosure, the one or more scanners 104a may be fixed on the top of the augmented reality mirror 116 in the augmented reality display system 200. In another embodiment of the present disclosure, the one or more scanners 104a may be present on any suitable position.

The third party scanning setup 102 includes but may not be limited to an interactive kiosk, a turntable, one or more lighting fixtures and an enclosure. The interactive kiosk may include a display panel, input devices, power ports and network ports for the bridging and serving data between the data processing system 110, the scanning system 104 and the augmented reality mirror 116. The interactive kiosk uses gesture navigation for on-screen navigation and display of augmented reality mirror 116. Moreover, the kiosk may be associated with the turntable. The user 106 may stand on the turntable and the one or more scanners may capture the plurality of depth images of the user 106.

The one or more scanners 104a may be configured to capture real time stream of exercise data of the user 106 in the fitness environment. The exercise data includes one or more exercise postures and position and movement information. In an embodiment of the present disclosure, the one or more scanners 104a include a multi-camera mobile device for performing body scan of the user 106. The multi-camera mobile device includes a first camera and a second camera. The first camera and the second camera are placed on the same face of the multi-camera mobile devices to capture a 2D image of the body of the user 106. The first camera and the second camera capture images of the body of the user 106 simultaneously. The 2D images may be processed in the mobile device or may be uploaded on cloud infrastructure for depth, posture and feature estimation. Examples of the multi-camera mobile device include but may not be limited to a smartphone, digital pocket camera and digital reflex single lens camera.

In another embodiment of the present disclosure, the one or more scanners 104a include a single camera mobile device for capturing 2D images of the body of the user 106. The single-camera mobile device includes a single camera on any face of the mobile device. The single camera mobile device captures two shots of 2D images of the body of the user 106 in a short duration of time. The two shots are captured with different focus and zoom. Each pair of two shots of 2D images may be processed in the mobile device or may be uploaded on cloud infrastructure for depth, posture and feature estimation. Examples of the single-camera mobile device include but may not be limited to the smartphones, pocket camera, hand cam and DSLR.

In yet another embodiment of the present disclosure, the one or more scanners 104a may be linked with an online portal. The scanned data of the body of the user 106 from the one or more scanners 104a may be uploaded via the online portal. The online portal may correspond to any e-solution or e-services website for processing the scanned data of the body of the user 106. The online portal may be accessed from any communication device. The communication device includes but may not be limited to personal computer, laptops, smartphones and tablets. The online portal may upload the scanned data on the data processing system 110 for calculation of feature metrics of the body. In addition, the calculated feature metrics may be used by the online portal to recommend products and accessories of correct fitting and sizes. Moreover, the online portal may recommend product and accessories overlaying on the image of the user 106.

In an example, the user X access a web based platform. The user X searches for the apparel on the web based platform. The web based platform asks for the bio-data, login details, preference in size, design, color and scan data of the user X. The scan data is 2D image and 3D image of the user X scanned by the scanning system 104. The web based platform analyzes the scan data and recommends the apparel to the user X on the basis of scan data. In an embodiment of the present disclosure, the recommendation may be displayed on the augmented reality mirror 116. In another embodiment of the present disclosure, the recommendation may be displayed on one or more communication devices. Moreover, the recommended apparel may overlay on the 2D image of the user X.

The scan data of the body of the user 106 is uploaded to the data processing system 110 through the communication network 108. In general, the communication network 108 is a part of a network layer responsible for connection of two or more communication devices. The communication network 108 may be any type of network. Examples of the communication network 108 include but may not be limited to a wireless mobile network, a wired network, a combination of wireless and wired network and an optical fiber high bandwidth network. Moreover, the communication network 108 provides a medium for transfer of information from the scanning system 104 to the data processing system 110.

The interactive computing environment includes the data processing system 110. In an embodiment of the present disclosure, the data processing system 110 is a cloud server for remote computation and processing. In another embodiment of the present disclosure, the data processing system 110 is a SoC (system on chip) embedded system installed in the third party scanning setup or computing devices. The data processing system 110 is used to process the scan data of the user 106 for different operations. In an example, the operation include but may not be limited to 3D body mapping, displaying body metrics, recommendation of the set of products, facilitates virtual trial room. The data processing system 110 performs statistical and probabilistic computation on image and the user 106 data. The data processing system 110 receives the set of data which includes the plurality of depth maps of the body of the user 106. The set of data is analyzed to infer the plurality of spatial parameters of the body of the user 106. The plurality of spatial parameters includes but may not be limited to a posture of the body, a position of each feature of a plurality of features of the body. In addition the plurality of spatial parameters includes an axis of reference, a position of joints and a height of the body of the user 106. Each feature corresponds to an identifiable portion of a human body. Examples of feature include but may not be limited to head, neck, leg, arm, shoulder, chest, waist, biceps, butts and torso. The depth data from 3D and 2D images can be used to estimate body metrics. The depth data includes but may not be limited to 3D data, 2D data, reconstructed 3D data, pseudo 3D data and direct depth data.

Furthermore, the data processing system 110 estimates the position of each feature of the plurality of features of the body of the user 106. In an embodiment of the present disclosure, the position of each feature of the plurality of features of the body of the user 106 is estimated based on a machine learning model. The machine learning model is trained on stochastic modeling of the plurality of data points. In another embodiment of the present disclosure, the position of each feature of the plurality of features of the body of the user 106 is estimated by other suitable method. The data processing system 110 slices each feature of the plurality of features to measures a set of feature metrics of each sliced feature of the plurality of features. The set of feature metrics are associated with spatial geometric measurements of the body of the user 106. Moreover, the set of feature metrics include but may not be limited to a body height, a leg length, an arm length, a shoulder width, a chest radius, a waist radius, a buttocks radius. In addition, the set of features metrics include an arm radius, a leg radius, a torso length and a shoulder length.

The data processing system 110 creates one or more feature metric databases for each sliced feature of the plurality of features. The data processing system 110 stores the one or more feature metric databases in the one or more user databases 110b. Each feature metric database of the one or more feature metric databases corresponds to a measured set of feature metrics. Each feature metric database of the one or more feature metric databases includes a normalized size and a range of sizes for each feature of the body of the user 106.

In an embodiment of the present disclosure, the data processing system 110 may process the set of feature metrics and the set of data for body scans in retail environments or retail portals for virtual product trial and assistance. The products include but may not be limited to apparels, footwear, eyewear and wearable accessories. In another embodiment of the present disclosure, the data processing system 110 may process the set of feature metrics. The processing of the set of feature metrics is used for the management of weight, body shape, body posture of the user 106 in the gym and health environment. The data processing system 110 is further associated with the third party server 112

The third party server 112 includes the third party database 112a. In an embodiment of the present disclosure, the third party server 112 is a dedicated server for a third party. The third party may be a product designer, a product manufacturer, a product distributor and a retailer. The third party server 112 shares data from the third party database 112a against requests from the data processing system 110. As the user 106 requests for a virtual product trial session, a platform is provided to the user 106 for providing login details or bio data. The third party database 112a includes feature metric records of size, image data, scan data and metadata for a library of products. The data processing system 110 shares a plurality of product features as a request to the third party server 110 of any third party. The plurality of product features includes a set of product dimensions from body fitting, a closure type, a fabric type, a material type, a material elasticity, a material texture and a material weight of the product. The data processing system 110 fetches 3D scan data and image data for the pre-defined set of products from the library of products. The pre-defined set of products may be fetched based on semantic context mining and comparisons of preferences of the user 106 with metadata of the library of the products.

In an embodiment of the present disclosure, the third party server 112 handles each operation and task performed by the data processing system 110. The third party database 112a includes feature metric records of size, image data, and scan data for a set of products. When the user 106 request for a virtual product trial session through the web based platform, the data processing system 110 fetches the 3D scan data and image data for the preferred product from the set of products. The third party server is associated with one or more administrator. In an embodiment of the present disclosure, the third party is an administrator 114 of the third party server 112. The administrator 114 may be any person or individual. In an example, the administrator 114 may be a product designer, a product manufacturer, a product distributor and a retailer.

In an embodiment of the present disclosure, the data processing system 110 may serve the one or more recommendation of products on the augmented reality mirror 116. The user 106 is served with options to virtually try recommended products in the augmented reality mirror 116. In another embodiment of the present disclosure, the data processing system 110 may serve the one or more recommendation of product on any communication device. The communication device includes but may not be limited to personal computer, laptops, smart phones and tablets.

The interactive computing environment includes the augmented reality mirror 116 as a display screen in the third party scanning setup 102. The augmented reality mirror 116 includes a first region and a second region (as shown in FIG. 1B). The size and location of the augmented reality mirror 116 depends on the user 106 and the third party. The first region of the augmented reality mirror 116 is coated with a reflective coating 116a to display the reflection of the user 106. The second region of the augmented reality mirror 116 is coated with a dispersive coating 116b to allow the display device 118 to display on the second region of the augmented reality mirror 116. The dispersive coating 116b allows the user 106 to display the image of the user 106 on the first region of the augmented reality mirror 116 with one or more overlay information. The augmented reality mirror 116 may include two modes. The two modes include a power off mode and a power on mode. In the power off mode, the augmented reality mirror 116 acts as a standard reflective mirror. In the power on mode, the augmented reality mirror 116 becomes a display device. In another embodiment of the present disclosure, the augmented reality display system 202 may include a separate display screen to show the augmented image of the user 106. In an embodiment of the present disclosure, the separate display screen includes a dispersive coating 116b on the surface of the screen. The display screen may or may not be positioned in the same environment.

In an embodiment of the present disclosure, the one or more overlay information includes information related to fitness, health, and apparel. In an example, the one or more overlay information includes but may not be limited to weight, height, temperature, pulse rate and blood pressure of the user 106. In another embodiment of the present disclosure, the one or more overlay information includes recommendation of apparels to the user 106. The user 106 virtually tries recommended apparels on the augmented reality mirror 116. In an embodiment of the present disclosure, the apparel may overlay with 2D image or 3D image of the user 106 scanned by the one or more scanners 104a. In an example, the recommendation of the apparel is based on the 3D body mapping, size of each feature of the plurality of features, body scan data, information provided by the user 106. In yet another embodiment of the present disclosure, the one or more overlay information includes display of the body metrics of the user 106 for fitness activities. The fitness activities include exercises, yoga, and aerobic. In yet another embodiment of the present disclosure, the one or more overlay information includes the interaction with the one or more users. The interaction with the one or more users may be in the form of text, audio and video. In yet another embodiment of the present disclosure, the one or more information is any electronic information. In an example, the electronic information includes but may not be limited to news headlines, read emails and schedule of appointments.

The third party scanning set up 102 includes the display device 118 for displaying the overlay information on the large screen. In an embodiment of the present disclosure, the display device is a projector. In another embodiment of the present disclosure, the display device 118 is a liquid crystal display (LCD). The display device 118 is used for displaying an original image with magnification. The display device 118 used in the third party scanning setup 102 is a remote control projector. The display device 118 is positioned at an angle near the second region of the augmented reality mirror 116 for the projection. In an embodiment of the present disclosure, the display device 118 is fixed. In another embodiment of the present disclosure, the display device 118 may move in forward and backward direction to adjust the projection area. The region with the projection is visible to the user 106 on the first region of the augmented reality mirror 116. The area left without projection acts like the reflective mirror to the user 106. In another embodiment of the present disclosure, the display device 118 may be any other device for displaying image of the user 106.

FIG. 2 illustrates a block diagram 200 of an augmented reality display system 202, in accordance with various embodiments of the present disclosure. It may be noted that to explain the system elements of FIG. 2, references will be made to the system elements of the FIG. 1. The augmented reality display system 202 includes the scanning system 104, the data processing system 110, the augmented reality mirror 116 and the display device 118. The scanning system 104 (as explained in detailed description of FIG. 1) includes the one or more scanners 104b for the scan of the body of the user 106. The scan data of the user 106 is uploaded to the data processing system 110. The data processing system 110 processes the scan data of the user 106. The augmented reality mirror 116 (as explained in detailed description of FIG. 1) is a mirror used to reflect the image of the user 106 with one or more overlay information. The display device 118 (as explained in detailed description of FIG. 1) is positioned at an angle near the rear side of the augmented reality mirror 116 to display the image of the user with one or more overlay information.

The data processing system 110 includes the processor 110a for processing of the scan data of the user 106. The processor 110a includes a reception module 204, a collection module 206, an analyzing module 208, an estimation module 210, a slicing module 212, a measuring module 214, and a creation module 216. In addition, the data processing system 110 includes a mapping module 218, a monitoring module 220, a recommendation module 222, a constructing module 224, an overlaying module 226, a displaying module 228, a developing module 230, a sharing module 232 and a storing module 234. The data processing system 110 includes the reception module 204. The reception module 204 receives the first set of data of the user 106. The first set of data includes the scan data, 2D images, 3D images, depth images of the user 106 scanned by the one or more scanners 104a. In addition, the first set of data includes the plurality of depth maps of the body of the user 106. The plurality of depth maps are processed from the plurality of depth images of body of the user 106.

The data processing system 110 includes the collection module 206. The collection module collects the second set of data of the user 106. The second set of data includes user 106 preference for different activities. The activities include choosing the apparel, choosing accessories and the like. In addition, the activity may be any fitness and health related activity. Moreover, the second set of data includes the position of the user 106 with respect to the augmented reality mirror 116. The analyzing module 208 analyzes the first set of data and the second set of data. The analysis of the first set of data and the second set of data is done in real time. The analyzing module 208 is used to analyze the plurality of spatial parameters. The plurality of spatial parameters include but may not be limited to the posture of the body, the position of each feature of the plurality of features of the body, the axis of reference and the position of joints. In an example, the analyzing module 208 analyze the likes and dislikes of the user 106 on the basis of the first set of data and the second set of data associated with the user 106.

The estimation module 210 estimates the position of each feature of the plurality of features of the body of the user 106. In an embodiment of the present disclosure, the position of each feature of the plurality of features of the body of the user 106 is estimated based on the machine learning model. The machine learning model is trained on stochastic modeling of the plurality of data points. In another embodiment of the present disclosure, the position of each feature of the plurality of features may be estimated by any suitable method. The slicing module 212 slices each feature of the plurality of features of the body of the user 106. Each feature is sliced at the slicing angle along the axis of reference and through the geometric center of corresponding features. The slicing angle is corrected for each feature along the axis of reference. The approximate geometric center is determined for each feature of the plurality of features of the body of the user 106. In an example, the sliced feature may be the hand, the neck, the leg and the chest.

The measuring module 214 measures the set of feature metrics of each sliced feature of the plurality of features. The set of feature metrics are associated with the spatial geometric measurements of the body of the user 106. The measurement of each sliced feature is done by the elimination of at least one of speckle noise, one or more non-feature regions, creases and folds. In an example, the sliced feature of the user Y is hand. The measuring module 214 measures the dimension, size, radius of the hand from different possible views and orientations. The creation module 216 creates the one or more feature metric databases. The one or more feature metric databases correspond to the data of feature metrics for each sliced feature of the plurality of features. Furthermore, each feature metric database of the one or more feature metric databases includes a normalized size and a range of sizes for each feature of the body of the user 106.

In an example, the user X stands in front of the augmented reality mirror 116. The user X searches for the apparel. The scanning system 104 scans the body of the user X The data processing system 110 receives a first set of data of the user X with the help of the reception module 204. The first set of data may include 3D, 2D image of the user X. Further, the data processing system 116 collects the second set of data associated with the user X with the help of the collection module 206. The second set of data may include user preferences in size, color, design and position of the user with respect to the augmented mirror 116. The analyzing module 208 analyzes the first set of data and the second set of data. The estimation module 210 estimates the position of each feature of the plurality of features of the body of the user X. In addition, the estimation module 210 estimates the position of each features of the body from the depth images or set of data of the user X. The slicing module 212 slices each feature of the plurality of features of the body of the user X. The slicing of each feature of the plurality of features is used to measure the size and range of sizes of each feature of the plurality of features. The measuring module 214 measures the size, dimension, range of sizes of each feature of the plurality of features of body of the user X. The creation module 216 creates the database of each of the measured feature of the plurality of features of the user X for further processes.

The mapping module 218 maps the one or more records of the one or more feature metric databases with corresponding feature metric records for each product of the predefined set of products. In an example, the user A searches for the apparels. The mapping module 218 maps the different size of each feature of the plurality of features of the user A with the available apparels in the store or the web based platform. The mapping of each feature of the plurality of features with corresponding set of product is used for the recommendation of specific set of products to the user 106. The monitoring module 220 monitors the one or more activities of the user 106. The one or more activities of the user 106 may be related to health, fitness and searching for a product. Further, the monitoring module 220 monitors a deviation in one or more exercise posture of the body of the user 106 from the reference set of exercise posture in the real time. In an example, the monitoring module 220 monitors the change in weight, change in any feature metric of the plurality of features of the body of the user 106. The monitoring is done on the basis of the machine learning model. In an embodiment of the present disclosure, the augmented reality display system 202 includes a presentation module. The presentation module presents a life-sized virtual assistant to the user 106. The life sized virtual assistant is presented or projected based on one or more gestures, one or more body postures, one or more audio inputs and one or more light or pressure activation switches by the user 106 in real time.

The data processing system 110 includes the recommendation module 222. In an embodiment of the present disclosure, the recommendation module 222 recommends the one or more products to the user 106. In another embodiment of the present disclosure, the recommendation module 222 recommends the one or more fitness exercise routines and the one or more diet routines to the user 106. The recommendation of the one or more fitness exercise routines or one or more diet routine to the user 106 is based on the change in feature metrics of the user 106. Further, the recommendation of the one or more fitness exercise routines and the one or more diet routines to the user is based on date stamped and time stamped progressive analysis. The progressive analysis is based on the one or more changes in each feature of the plurality of features of the body. Moreover, the one or more fitness exercise routine is recommended on the one or more virtual fitness models of the user 106 for a visual workout plan. In an embodiment of the present disclosure, the recommendation module 222 may recommend on the augmented reality mirror 116. In another embodiment of the present disclosure, the recommendation module 222 may recommend on the one or more communication devices.

The constructing module 224 constructs the one or more three-dimensional body models. The three-dimensional body models depict the body of the user on the basis of the one or more recommendations of the products. Each three-dimensional body model is provided with one or more layers of virtual fittings of the one or more products of the pre-defined set of products. In an example, the user 106 searches for a shirt on the web based platform. The recommendation module 222 recommends a shirt to the user 106 on the basis of user preferences. The constructing module 224 constructs the three-dimensional models of the user overlaying the shirt recommended by the recommending module 222.

The data processing system 110 includes the overlaying module 226. The overlaying module 226 overlay at least one of the one or more products over the body of the user and one or more information on the augmented reality mirror in real time. The one or more products overlaid are based on the one or more recommendation of products. The one or more recommendation of products are based on a positive mapping of the one or more records of the one or more feature metric databases of the body with corresponding feature metric records of the products. In addition, the overlaying of the one or more products is based on the second set of data. The displaying module 228 displays at least one of the overlaid one or more products over the body of the user 106 and the one or more fitness related information on the augmented reality mirror in real time. The displaying module 228 display at least one of the overlaid one or more products and fitness related information through the display device in real time The data processing system 110 includes the developing module 230. The developing module 230 develops a body profile, an exercise profile, a diet profile and a product selection profile of the user. The body profile includes the set of feature metrics based on date stamped and time stamped progressive scans of the body of the user. The exercise profile includes a progress data of performed exercises, data points for changes in body metrics, and a time and date of exercise routine. The diet profile includes a diet routine of the user and a set of calories consumed for each diet routine segregated on the basis of an event, diet routines in a day, a week, a month and a year. The product selection profile includes a list of product selection from the one or more recommendation of products. In addition, the product selection profile includes a preference of cloth type, material type, fabric type, fitting, color, brand, size, price, designer and reseller.

The sharing module 232 shares the one or more features metric database to the third party (as discussed in the detailed discussion of FIG. 1). In an example, a user B accesses the web based platform. The user B searches for the eyewear accessory on the web based platform. The sharing module 232 shares the feature metric database of eyes of the user B to the third party. The third party may include the web based platform of eye wear accessories. In an embodiment of the present disclosure, the third party may recommend eyewear accessories corresponding to the feature metric database. In another embodiment of the present disclosure, the third party may recommend eyewear accessories overlaying on the image of the user B.

In an embodiment of the present disclosure, the data processing system 110 includes the storing module 234. The storing module 234 stores the body profile, the diet profile, the product selection profile, the exercise profile and the feature metric database of the user 106 in the cloud database. Further, the storing module 234 stores and updates the data of the user 106 in real time.

Continuing with the above stated example, the creation module 216 creates the database of each metric feature of the plurality of features of body of the user X. The mapping module 218 maps the database of each metric feature with the corresponding apparel. The monitoring module 220 monitors each activity performs by the user X in real time. The activity performs by the user X is related to the choice of apparel. The recommendation module 222 recommends the apparel to the user X on the bases of mapping of each metric feature with the corresponding apparel. In addition, the recommended apparel is based on the first and second set of data. The constructing module 224 constructs the three-dimensional model of the user X wearing the recommended apparel over the model. The overlaying module 226 overlays one or more apparel on the 2D image of the user X. The displaying module 228 displays the information of the apparel recommended by the recommendation module 222. The developing module 230 develops the profile of the user X for the future selection of the apparel. In an example, the profile includes likes, dislikes, size preferences, color preferences and design preferences. The sharing module 232 shares the feature metric database of the user X to the web based platform or third party to increase the field of searching for the pre-define apparel. The storing module 234 stores and updates the scan data, 2D image, 3D image and body profile of the user X for future requirement.

In an embodiment of the present disclosure, the augmented reality display system 202 includes one or more accessories. In an example, the one or more accessories include but may not be limited to Wi-Fi, Bluetooth, microphones, 3D tracker and speakers. Further, the accessories includes one or more sensors to detect inputs such as touch screen, finger print reader, credit card scanner, retina display, proximity sensor, pulse rate sensors, voice based response and the like. In an embodiment of the present disclosure, the one or more accessories are present on the top of the augmented reality mirror 116. In another embodiment of the present disclosure, the one or more accessories are present in any suitable position on the augmented reality mirror 116. The one or more sensors are coupled with the one or more microcontrollers. The one or more microcontrollers are attached with the augmented reality mirror 116. The augmented reality display system 202 may include built in software in any computing devices for voice recognition, gesture response, facial recognition, sound recognition and emotion recognition. The built-in software works on different algorithms. With the help of such accessories and software, the user 106 may perform one or more task or may interact with the augmented reality display system 202. The one or more task includes but may not be limited to audio and video calling with the one or more user, payment transaction, exchange of data, health checkup and the like. In an embodiment of the present disclosure, the augmented reality display system 202 may include a touch screen on the front side of the augmented reality mirror 116 which would allow direct user interaction. The direct user interaction with the augmented reality display system 202 gives the user an immersive experience. In the immersive experience, the user feels as if they are in an artificially recreated environment with other users or alone. In addition, the artificially recreated environment may be with the life sized virtual assistant with or without the use of life size environment and personal information.

In yet another embodiment of the present disclosure, the augmented reality display system 202 may use facial recognition technique to recognize the face of the one or more user and store the information of the one or more user for further process. In an example, a user M stands in front of the augmented reality mirror 116. The augmented reality display system 202 fetches the information of the user M from the previous stored data. The information includes the name, age, gender, likes, dislikes, feature metric of each feature and preference of the user M for the set of products. The augmented reality display system 202 recognizes the face of the user M and welcomes the user M with the name. The user M searches for the specific product from the set of products. The augmented reality display system 202 shows the specific product on the basis of age, gender, likes, dislike, size and preference to the user M. The augmented reality display system 202 further asks for the services to user M. The services includes video calling, audio calling, any payment transaction, online shopping, e-learning, review electronic information, entertainment, accessing social network and the like.

In yet another embodiment of the present disclosure, the augmented reality display system 202 provides the option of purchasing the desired product to the user 106 in real time. The user 106 may purchase the product after selecting the desired product or may add the product in a shopping cart and may search for other products. The shopping cart is a listing of the selected products from the catalog. In an example, the user 106 may select the product by gestures, double tapping on the product and may put the product in the shopping cart by tap and drag techniques. After selecting the desired product, the user 106 may complete the transaction by providing some important information to the third party processor such as paypal. The information includes personal account number (PAN) data such as bank account numbers, credit card numbers, debit card numbers, expiration dates, card verification code and one time password. In addition, the augmented reality display system may use software to allow the user 106 to make payments using screen tap NFC or finger print scanning, Bluetooth or QR code scanning.

In yet another embodiment of the present disclosure, the augmented reality display system 202 may provide the life-sized virtual assistant to the user 106 in real time. In an embodiment of the present disclosure, the life-sized virtual assistant may be displayed through another display device positioned in a vicinity of the user 106. The life-sized virtual assistant may guide the user 106 in different activities based on the gestures, postures, audio inputs, activation switches. The activities include but may not be limited to choosing products, fitness exercises and e-services. The life-sized virtual assistant may communicate with the user 106 to assist product information, answer questions, give advice on product search and fitness related activities, provide specification and the like. Further, the life-sized virtual assistant may interact with the user 106 with the help of one or more speakers, microphones, display devices and input devices present in the augmented reality display system 202. The user 106 may perform different tasks on the basis of audio inputs. The task includes but may not be limited to make calls, play music, open apps, search products and make transaction. In an example, the user 106 may search the apparel with the help of audio inputs, touch screen and gestures. The user 106 may zoom in or zoom out the apparel designs, maps on the augmented reality mirror 116. The user 106 may swipe left and right for the selection of desired apparel on the augmented reality mirror 116. In addition, the user 106 may give commands in the form of audio inputs to the augmented reality display system 202 to perform the specific task. Further, the user 106 may tap and drag the picture from one place to another place on the augmented reality mirror 116. Furthermore, the augmented reality display system 202 may use hand gesture recognition technique to allow the user 106 to perform different tasks without physically touching the augmented mirror 116.

In yet another embodiment of the present disclosure, the augmented reality display system 102 may or may not include a 3D tracker. The 3D tracker tracks the movement of the user 106 and extracts the information of the movement of the user 106. The augmented reality display system 102 may use 3D tracker to insert different graphics to the moving image of the user 106. The tracking of the movement of the user 106 is done with the help of a background running software.

In an embodiment of the present disclosure, when the user 106 stands in front of the augmented reality mirror 116, the height and weight of the user 106 is automatically measured with the help of one or more sensors. The augmented reality display system 116 displays the information or overlay apparel to the user 106 according to the height and weight of the user 106. In another embodiment of the present disclosure, the user 106 may manually change the size of the information or overlay apparel displayed by the augmented reality display system 202, with any specific remote control.

In an embodiment of the present disclosure, the augmented reality display system 202 detects the position of the user 106 when the user 106 moves in front of the augmented reality mirror 116. The augmented reality display system 202 changes the display according to the position of the user 106. In another embodiment of the present disclosure, the augmented reality display system 202 may not detect the position of the user 106 when the user 106 moves in front of the augmented reality mirror 116. The augmented reality display system 202 may remind the user 106 not to change the position to get the clear composite image of the user 106 while virtually trying any apparel on the front side of the augmented reality mirror 116. The composite image includes the image of the user 106 with the apparel. The reminder may be in the form of text displayed on the front side of the augmented reality mirror 116.

The augmented reality display system 202 with large screen display of the augmented reality mirror 116 is used for the interaction with one or more users. The augmented reality mirror 116 with the display device 118 makes the user 106 feel presence of the one or more users in the same environment. The environment includes but may not be limited to meeting room, office and home. Further, the augmented reality display system 202 is used for the health related activities. The health related activities include but may not be limited to interaction with the one or more doctors for consultations, diagnosis and prescriptions. In an example, the user U access the web based platform. The web based platform provides the interaction with one or more doctors in real time. In an embodiment of the present disclosure, the one or more scanners 104a scans the body of the user U and uploads the scan data on the web based platform. In another embodiment of the present disclosure, the one or more scanner 104a with additional sensors scans the body of the user U and uploads the scan data on the web based platform. The scan data include but may not be limited to 3D image, pulse rate, body weight, body temperature and the height of the user U. The one or more doctors associated with the web based platform fetches the information from the scan data. The information may be a disjoint in one or more bones, increase or decrease in body temperature, pulse rate. The one or more doctors may prescribe the user U on the basis of the information fetched from the scan data.

It may be noted that in FIG. 2, the augmented reality display system 202 processes the 2D and 3D scan data of the user 106; however, those skilled in the art would appreciate that the augmented reality display system 202 simultaneously processes the 2D and 3D scan data of more number of users in real time.

FIGS. 3A and 3B illustrates an example of a method 300 for displaying overlaid information on the body of the user 106. The method 300 initiates at step 302. Referencing the augmented reality display system 202, at step 304, the reception module 204 receives the first set of data. The first set of data includes the plurality of depth maps of the body of the user 106. The first set of data characterizes the three-dimensional geometry of the body of the user 106 from the plurality of spatial parameters. At step 306, the collection module 206 collects the second set of data. The second step of data is associated with the user 106. At step 308, the analyzing module 208 analyzes the first set of data and the second set of data. At step 310, the estimation module 210 estimates the position of each feature of the plurality of features of the body of the user 106. At step 312, the slicing module 212 slices each feature of the plurality of features of the body of the user 106 at a slicing angle along the axis of reference and through a geometric center of corresponding features. In addition, the slicing angle is corrected for each feature along the axis of reference. Moreover, the approximate geometric center is determined for each feature of the plurality of features of the body. At step 314, the measuring module 214 measures the set of feature metrics of each sliced feature of the plurality of features. The set of feature metrics are associated with the spatial geometric measurements of the body. At step 316, the creation module 216 creates one or more feature metric databases. The one or more feature metric databases correspond to the measured set of feature metrics for each sliced feature of the plurality of features. At step 318, the mapping module 218 maps one or more records of the one or more feature metric databases with corresponding feature metric records of a pre-defined set of products. At step 320, the overlaying module 226 overlays at least one of one or more products over the body of the user 106. In addition, the one or more information is overlaid on the augmented reality mirror 116 in real time. At step 322, the displaying module 228 displays the at least one of the overlaid one or more products over the body of the user 106 and the one or more fitness related information on the augmented reality mirror 116 in real time. The method 300 terminates at step 324.

FIG. 4 illustrates a block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

From the above description, it will be appreciated that many variations are possible in an augmented reality system. The following numbered paragraphs describe aspects and features of embodiments. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second, or third, for identified elements are used to distinguish between the elements, and do not indicate a required or limited number of such elements, and do not indicate a particular position or order of such elements unless otherwise specifically stated.

What is claimed is:

1. An augmented reality display system for rendering an image of a user of one or more users on a display of a mirror for overlaying one or more information on the mirror in real time, the augmented reality display system comprising:
   an augmented reality mirror that comprises a reflective coating on a first region of the augmented reality mirror and a dispersive coating on a second region of the augmented reality mirror, wherein the first region and the second region are opposite to each other;
   a display device positioned at an angle from the second region of the augmented reality mirror, wherein the display device is configured to display an augmented reality image of the user located in proximity of the augmented reality mirror in real time;
   a scanning system positioned in a vicinity of the augmented reality mirror; wherein the scanning system comprises one or more scanners that scan body of the user with different angles and position in real time to obtain at least one of (i) a 3 Dimensional image and (ii) a 2 Dimensional image of the user; and
   a data processing system that comprises a processor that is configured to:
      receive a first set of data comprising a plurality of depth maps of the body of the user, wherein the plurality of depth maps are generated from a plurality of depth images of body of the user;
      analyze the first set of data by inferring a plurality of spatial parameters that comprise one or more of an axis of reference for the body, a height of the body, a skeletal model of the body with a position of joints, a posture of the body, or a plurality of features of the body;
      collect a second set of data associated with the user, wherein the second set of data comprises user preference data and a position of the user with respect to the augmented reality mirror;
      analyze the second set of data in real time;
      estimate the position of each feature of the plurality of features of the body of the user along with a geometric center of each feature of the body, wherein the geometric center of each feature of the body is estimated using an axis of reference for the body, the height of the body, the skeletal model of the body with position of the joints and the posture of the body;
      determine slicing positions for each feature of the plurality of features of the body based on the estimated geometric center of each feature of the plurality of features of the body;
      measure a plurality of spatial geometric parameters of each feature of the plurality of features by slicing at the determined slicing positions at a slicing angle along the axis of reference for the body and through the geometric center of each feature of the body;
      generate, a set of feature metrics based on the plurality of spatial geometric parameters of each feature of the plurality of features, wherein the set of feature metrics of each sliced feature is measured by elimination of one or more speckle noise, one or more non-feature regions, creases and folds;
      create one or more feature metric databases using the set of feature metrics for each sliced feature of the plurality of features, wherein each feature metric database of the one or more feature metric databases comprises a normalized size and a range of sizes for each feature of the body of the user;
      map one or more records of the one or more feature metric databases to record a pre-defined set of products;
      overlay at least one of one or more products over the body of the user and one or more information on the augmented reality mirror in real time, wherein the one or more products are overlaid based on one or more recommendations of products based on a positive mapping of the one or more records of the one or more feature metric databases of the body with corresponding feature metric records of the products, wherein the overlaying of the one or more products is done based on the second set of data; and display at least one of the overlaid one or more products over the body of the user and one or more fitness related information on the augmented reality mirror in real time based on one or more fitness exercise routines and one or more diet routines of the user, wherein the displaying is done through the display device in real time.

2. The augmented reality display system as recited in claim 1, wherein the processor is further configured for generate one or more three-dimensional body models matching the body of the user in real time based on selection of the one or more recommendations of the products.

3. The augmented reality display system as recited in claim 1, wherein the pre-defined set of products comprises apparels, footwear, eyewear and wearable accessories, wherein each three-dimensional body model is rendered with one or more layers of virtual fittings of one or more products of the pre-defined set of products.

4. The augmented reality display system as recited in claim 1, wherein the processor is further configured to develop a body profile, an exercise profile, a diet profile and a product selection profile of the user, wherein the body profile comprises the set of feature metrics based on date stamped and time stamped progressive scans of the body of the user, wherein the exercise profile comprises a progress data of performed exercises, data points for changes in body metrics, and a time and date of exercise routine, wherein the diet profile comprises a diet routine of the user and a set of calories consumed for each diet routine segregated on basis of an event, diet routines in a day, a week, a month and an year, wherein the product selection profile comprises a list of product selection from the one or more recommendation of products, and a preference of cloth type, material type, fabric type, fitting, color, brand, size, price, designer and reseller.

5. The augmented reality display system as recited in claim 1, wherein the processor is further configured to share a plurality of product features corresponding to each product of the pre-defined set of products to a third party, wherein the third party is selected from a group comprising an product designer, a product manufacturer, a product distributor and a retailer wherein the plurality of product features comprises a set of product dimensions from body fitting, a closure type, a fabric type, a material elasticity, a material texture and a material weight of each product.

6. The augmented reality display system as recited in claim 1, wherein the set of feature metrics comprises a body height, a leg length, an arm length, a shoulder width, a chest radius, a waist radius, a buttocks radius, an arm radius, a leg radius, a torso length, a shoulder length, an angle of inclination of shoulder and a neck radius, wherein the position of each feature of the plurality of features of the body of the user is estimated based on a machine learning model trained on stochastic modeling of a plurality of data points of the set of data, wherein the one or more non-feature regions in each sliced feature of the plurality of features of the body comprises features of background objects, worn apparels and devices.

7. The augmented reality display system as recited in claim 1, wherein the processor is further configured to recommend the one or more fitness exercise routines and the one or more diet routines to the user based on date stamped and time stamped progressive analysis of one or more changes in each feature of the plurality of features of the body, wherein the one or more fitness exercise routines are rendered on one or more virtual fitness models of the user for a visual workout plan.

8. The augmented reality display system as recited in claim 7, wherein the processor is further configured to monitor a deviation in one or more exercise postures of the body of the user for each of the one or more fitness exercise routines from a reference set of exercise postures in real time based on the machine learning model.

9. The augmented reality display system as recited in claim 1, wherein the processor is further configured to present a life-sized virtual assistant to the user based on one or more gestures, one or more body postures, one or more audio inputs and one or more light or pressure activation switches by the user in real time.

10. The augmented reality display system as recited in claim 1, wherein the processor is further configured to store the first set of data, the second set of data, a body profile, a diet profile, a product selection profile and an exercise profile of the user, wherein the body profile, the diet profile, the product selection profile and the exercise profile are stored in real time.

11. A computer-implemented method for rendering an image of a user of one or more users on a display of a mirror for overlaying one or more information on the mirror in real time, the computer-implemented method comprising:

scanning, at a scanning system with one or more scanners, scan body of the user with different angles and position in real time to obtain at least one of (i) a 3Dimensional image and (ii) a 2Dimensional image of the user;

receiving, at a data processing system with a processor, a first set of data comprising a plurality of depth maps of body of the user, wherein the plurality of depth maps are generated from a plurality of depth images of body of the user, analyzing the first set of data by inferring a plurality of spatial parameters that comprise one or more of an axis of reference for the body, a height of the body, a skeletal model of the body with a position of joints, a posture of the body, or a plurality of features of the body;

collecting, at the data processing system with the processor, a second set of data associated with the user, wherein the second set of data comprises user preference data and a position of the user with respect to an augmented reality mirror;

analyzing, at the data processing system with the processor, the second set of data in real time;

estimating, at the data processing system with the processor, the position of each feature of the plurality of features of the body of the user along with a geometric center of each feature of the body, wherein the geometric center of each feature of the body is estimated using an axis of reference for the body, the height of the body, the skeletal model of the body with position of the joints and the posture of the body;

determining slicing positions for each feature of the plurality of features of the body based on the estimated geometric center of each feature of the plurality of features of the body;

measuring a plurality of spatial geometric parameters of each feature of the plurality of features by slicing at the determined slicing positions at a slicing angle along the axis of reference for the body and through the geometric center of each feature of the body;

based on the plurality of spatial geometric parameters of each feature of the plurality of features, wherein the set of feature metrics of each sliced feature is measured by elimination of one or more speckle noise, one or more non-feature regions, creases and folds;

creating, at the data processing system with the processor, one or more feature metric databases using the set of feature metrics for each sliced feature of the plurality of features, wherein each feature metric database of the one or more feature metric databases comprises a normalized size and a range of sizes for each feature of the body of the user;

mapping, at the data processing system with the processor, one or more records of the one or more feature metric databases to record a pre-defined set of products;

overlaying, at the data processing system with the processor, at least one of one or more products over the body of the user and one or more information on the augmented reality mirror in real time, wherein the one or more products are overlaid based on one or more recommendations of products based on a positive mapping of the one or more records of the one or more feature metric databases of the body with corresponding feature metric records of the products, wherein the overlaying of the one or more products is done based on the second set of data; and displaying, at the data processing system with the processor, at least one of the overlaid one or more products over the body of the user and one or more fitness related information on the augmented reality mirror in real time based on one or more fitness exercise routines and one or more diet routines of the user, wherein the displaying is done through the display device in real time.

12. The computer-implemented method as recited in claim 11, further comprising generating, at the data processing system with the processor, one or more three-dimensional body models matching the body of the user in real time with one or more static or dynamic display positions, fitted with one or more of the recommended products on the display device of the user.

13. The computer-implemented method as recited in claim 11, wherein the pre-defined set of products comprises apparels, footwear, eyewear and wearable accessories, wherein each three-dimensional body model is rendered with one or more layers of virtual fittings of one or more products of the pre-defined set of products.

14. The computer-implemented method as recited in claim 11, further comprising developing, at the data processing system with the processor, a body profile, an exercise profile, a diet profile and a product selection profile of the user, wherein the body profile comprises the set of feature metrics based on date stamped and time stamped progressive scans of the body of the user, wherein the exercise profile comprises a progress data of performed exercises, data points for changes in body metrics, and a time and date of exercise routine, wherein the diet profile comprises a diet routine of the user and a set of calories consumed for each diet routine segregated on basis of an event, diet routines in a day, a week, a month and an year, wherein the product selection profile comprises a list of product selection from the one or more recommendation of products, and a preference of cloth type, material type, fabric type, fitting, color, brand, size, price, designer and reseller.

15. The computer-implemented method as recited in claim 11, further comprising sharing, at the data processing system with the processor, a plurality of product features corresponding to each product of the pre-defined set of products to a third party, wherein the third party is selected from a group comprising an product designer, a product manufacturer, a product distributor and a retailer, wherein the plurality of product features comprises a set of product dimensions from body fitting, a closure type, a fabric type, a material elasticity, a material texture and a material weight of each product.

16. The computer-implemented method as recited in claim 11, wherein the set of feature metrics comprises a body height, a leg length, an arm length, a shoulder width, a chest radius, a waist radius, a buttocks radius, an arm radius, a leg radius, a torso length, a shoulder length, an angle of inclination of shoulder and a neck radius, wherein the position of each feature of the plurality of features of the body of the user is estimated based on a machine learning model trained on stochastic modeling of a plurality of data points of the set of data, wherein; the one or more non-feature regions in each sliced feature of the plurality of features of the body comprises features of background objects, worn apparels and devices.

17. The computer-implemented method as recited in claim 11, further comprising recommending, at the data processing system with the processor, the one or more fitness exercise routines and the one or more diet routines to the user based on date stamped and time stamped progressive analysis of one or more changes in each feature of the plurality of features of the body, wherein the one or more fitness exercise routines are rendered on one or more virtual fitness models of the user for a visual workout plan.

18. The computer-implemented method as recited in claim 17, further comprising monitoring, at the data processing system with the processor, a deviation in one or more exercise postures of the body of the user for each of the one or more fitness exercise routines from a reference set of exercise postures in real time based on the machine learning model.

19. The computer-implemented method as recited in claim 11, further comprising presenting at the data processing system with the processor, a life-sized virtual assistant to the user based on one or more gestures, one or more body postures, one or more audio inputs and one or more light or pressure activation switches by the user in real time.

20. The computer-implemented method as recited in claim 11, further comprising storing, at the data processing system with the processor, the first set of data, the second set of data, a body profile, a diet profile, a product selection profile and an exercise profile of the user, wherein the body profile, the diet profile, the product selection profile and the exercise profile are stored in real time.

* * * * *